(12) United States Patent
Held et al.

(10) Patent No.: US 6,177,972 B1
(45) Date of Patent: Jan. 23, 2001

(54) POLYMER STABILIZED IN-PLANE SWITCHED LCD

(75) Inventors: Glenn Allen Held, Pelham; Shui-Chih Alan Lien, Briarcliff Manor, both of NY (US); Do Yeung Yoon, Los Gatos, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/244,189

(22) Filed: Feb. 4, 1999

(51) Int. Cl.[7] .......................... G02F 1/1333; G02F 1/1343
(52) U.S. Cl. .................. 349/88; 349/141; 349/93
(58) Field of Search ............................... 349/141, 88, 86, 349/92, 93

(56) References Cited

U.S. PATENT DOCUMENTS

| | | | |
|---|---|---|---|
| 4,345,249 | * | 8/1982 | Togashi .................................. 349/141 |
| 4,925,708 | * | 5/1990 | Waters et al. ........................... 349/86 |
| 5,305,126 | * | 4/1994 | Kobayashi et al. ..................... 349/86 |
| 5,422,036 | * | 6/1995 | Kawakami et al. ..................... 349/86 |
| 5,686,017 | * | 11/1997 | Kobayashi et al. .................... 349/86 |
| 5,814,378 | * | 9/1998 | Onishi et al. .......................... 349/86 |

OTHER PUBLICATIONS

Fung et al "Polymer networks formed in liquid crystals" Liquid Crystals 1995, vol. 19 No. 6, p. 797, May 1995.*

* cited by examiner

*Primary Examiner*—William L. Sikes
*Assistant Examiner*—Toan Ton
(74) *Attorney, Agent, or Firm*—McGinn & Gibb, P.C.; Marian Underweiser, Esq.

(57) ABSTRACT

An in-plane switched liquid crystal device IPS LCD which provides fast switching times is formed by filling an empty IPS LCD panel having an array of display elements with a mixture of nematic liquid crystal material and a mesogenic polymerizable material, such as monomers or polymer precursers and suitable photoinitiators, curing, or cross-linking agents, and then polymerizing the mixture such that a phase-separated network of cross-linked polymer strands is formed. The cross-linked network of polymer strands displays an average orientation whose average orientation substantially conforms with nematic orientation of the nematic liquid crystal material in its "field-off" state.

17 Claims, 3 Drawing Sheets

POLYMER STABILIZED IN-PLANE SWITCHED LCD

FIELD OF THE INVENTION

The present invention relates to liquid crystal display (LCD) devices. In particular, the invention relates to display panels for use in LCD devices, such as handheld personal organizers, flat-panel desktop displays, portable computers, and handheld personal communication devices.

BACKGROUND OF THE INVENTION

U.S. Pat. No 4,345,249 to S. Togashi describes a LCD display panel in which the electrodes of each display element of the LCD panel comprise a pair of intermeshed, or interdigitated, electrodes in substantially a single plane. U.S. Pat. No. 4,345,249 discloses a first comb-shaped electrode pattern, to which a display signal voltage is applied through a switching element, and a second comb-shaped electrode pattern which is held at a reference potential. The first and second comb-shaped patterns are mutually intermeshed and formed upon a single substrate of the panel, such that application of a display signal voltage causes an electric field to be produced in a direction substantially parallel to the substrate plane. Such a display has come to be referred to as an in-plane switched (IPS) LCD. This is in contrast to a conventional twisted nematic (TN) LCD, in which the electric field which acts upon the liquid crystal is produced in a direction normal to the substrate plane.

IPS LCDs typically have the advantage of much wider viewing angles than TN LCDs ( see M. Oh-e and K. Kondo, Appl. Phys. Lett. 67, 3895 (1995)) exhibiting less angle-dependent contrast and color variation. However, IPS displays typically have the disadvantage of slower switching times than conventional TN LCDs following the removal of the applied display signal voltage. These slower switching times have been one of the factors hindering the widespread adoption of IPS liquid crystal display panels despite the important advantage of much wider viewing angle.

SUMMARY OF THE INVENTION

It is an objective of the present invention to reduce the switching time of an IPS liquid crystal display device following removal of the applied display signal voltage. This is done by forming a network of polymer strands within the nematic liquid crystal. The switching of display elements of the IPS LCD panel or cell when the applied field is removed is believed to be aided by any reorientation force which may be applied by the display panel itself to the liquid crystal material. Typically in current IPS LC displays, this is done by alignment layers applied on the two substrates of the cell. According to the present invention, the formation of a network of polymer strands throughout the entire liquid crystal material is believed to provide an elastic orienting force which permeates the entire volume of the liquid crystal within the display panel, resulting in a faster switching time after the applied field is removed. Polymer networks have been shown to stabilize desired textures in cholesteric-based displays, as described in I. Dierking, L. L. Kosbar, A. Afzali-Ardakani, A. C. Lowe and G. A. Held, J. Appl. Phys. 81, 3007 (1997), the results being known as polymer stabilized cholesteric textures (PSCTs). U.S. Pat. No. 5,691,795 to J. William Doane et al. for "Polymer Stabilized Liquid Crystalline Light Modulating Device and Material" discusses the use of PSCT's in reflective displays and other light modulating devices.

Broadly, the present invention provides an in-plane switched liquid crystal display panel comprising:

a) a pair of substrates,
b) a layer of liquid crystal material disposed between said pair of substrates, said liquid crystal material having a nematic orientation in the absence of an applied electric field (i.e., in the "field-off" state),
c) a plurality of display elements, each display element comprising a pair of mutually intermeshed electrodes disposed in a substantially single plane, and
d) a network of phase-separated strands of mesogenic polymer distributed throughout said liquid crystal material, said polymer strands having an average orientation which substantially conforms with the aforesaid nematic orientation in the absence of an applied electric field.

The invention further provides a method of fabricating an in-plane switched liquid crystal display device panel comprising the steps of:

a) preparing a mixture of a nematic liquid crystal material (having a nematic orientation in the absence of an applied electric field) and a polymerizable material, preferably selected from mesogenic polymers and mesogenic polymer precursors (e.g. mesogenic monomers) having appropriate chain-growing (polymerizing) and cross-linking functional groups, together with photoinitiators and curing agents, admixed therewith, as necessary, to support polymerization,
b) introducing said mixture into an empty in-plane switched liquid crystal display (IPS LCD) panel comprising a pair of substrates, one of said substrates comprising a plurality of display elements formed thereon, each display element comprising a pair of mutually intermeshed electrodes disposed in a substantially single plane, and
c) initiating polymerization of said polymerizable material (e.g. thermally, by UV radiation) to cause it to form phase-separated strands of cross-linked polymer, said polymer strands having an average orientation which substantially conforms with said nematic orientation in the absence of an applied field.

The mesogenic polymeric material may be selected from UV-curable, thermoplastic, and thermosetting polymers and their monomeric precursors, including polymers formed from monomers having at least one chain-growing functional group (e.g. double bond) with or without the presence of cross-linking agents. By way of specific example, the liquid crystal material may be nematic liquid crystal E-48 (Merck Industries), the polymeric material may be formed from the monomer RM206 (Merck Industries) with benzoin methyl ether (BME) used as a photoinitiator responsive to UV (ultraviolet) radiation.

BRIEF DESCRIPTION OF THE DRAWINGS

The present invention will be understood more fully with reference to the detailed description of preferred embodiments thereof, taken together with the accompanying figures of drawings, in which.

DESCRIPTION OF PREFERRED EMBODIMENTS

Figure 1:
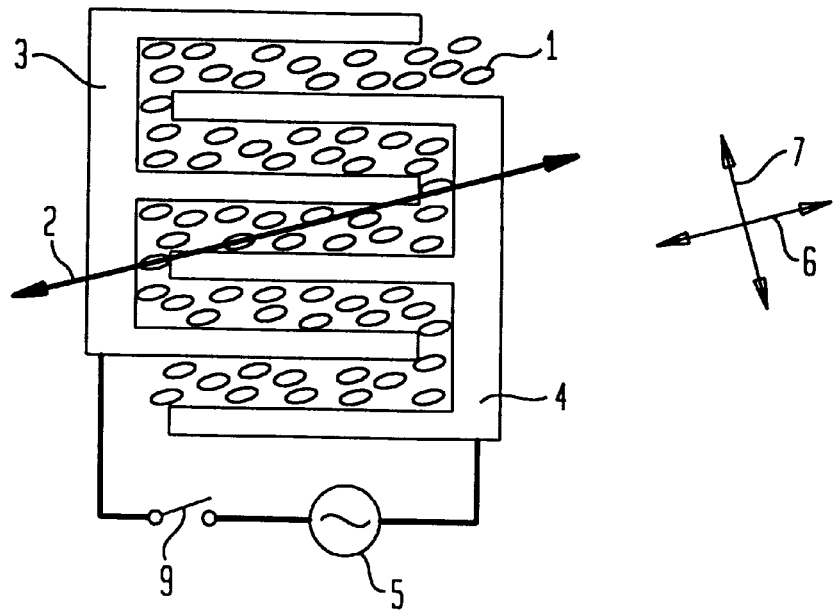
FIG. 1 shows a schematic view of a display element of a prior art in-plane switched (IPS) liquid crystal display panel, having liquid crystal material therein, in the absence of an applied electric field (i.e., in its field-off state).

FIG. 1 shows a schematic of a prior art IPS LCD panel or "cell" with the liquid crystal oriented in the field-off state, with the average nematic orientation of the molecules of the LCD material 1 indicated by the double-ended arrow 2. The IPS LCD cell is characterized by interdigitated electrodes 3, 4 which lie in substantially the same plane and are connected to a voltage source 5 via switch 9. As will be understood, this LCD cell has polarizer and analyser axes 6, 7 oriented parallel and normal, respectively, to the average nematic orientation of the LCD material 1.

Figure 2:
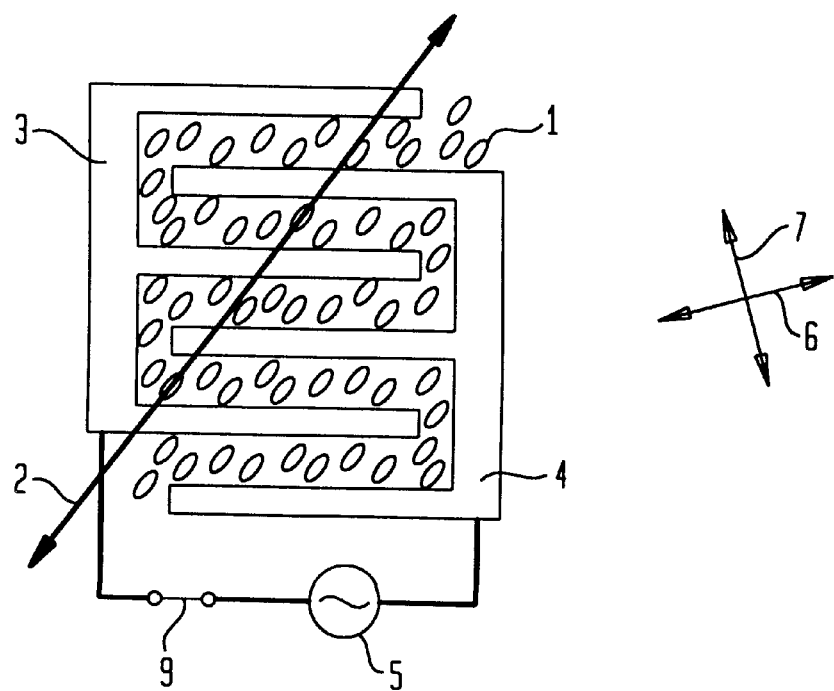
FIG. 2 shows a schematic view of a display element of a prior art in-plane switched (IPS) liquid crystal display panel, having liquid crystal material therein, in the presence of an applied electric field (i.e., in its field-on state).

FIG. 2 shows a schematic of the prior art IPS LCD cell of FIG. 1 when voltage is applied by closing switch 9 in the LCD panel's ON state. As can be seen, the molecules of LCD material 1 reorient to a new average nematic orientation at an angle to the polarizer axis 6, thereby permitting passage of light through the LCD cell. The LC material shown in this example has a positive dielectric anisotropy. The prior art IPS LCD principle works with negative dielectroanisotropic liquid crystals as well.

Figure 3:
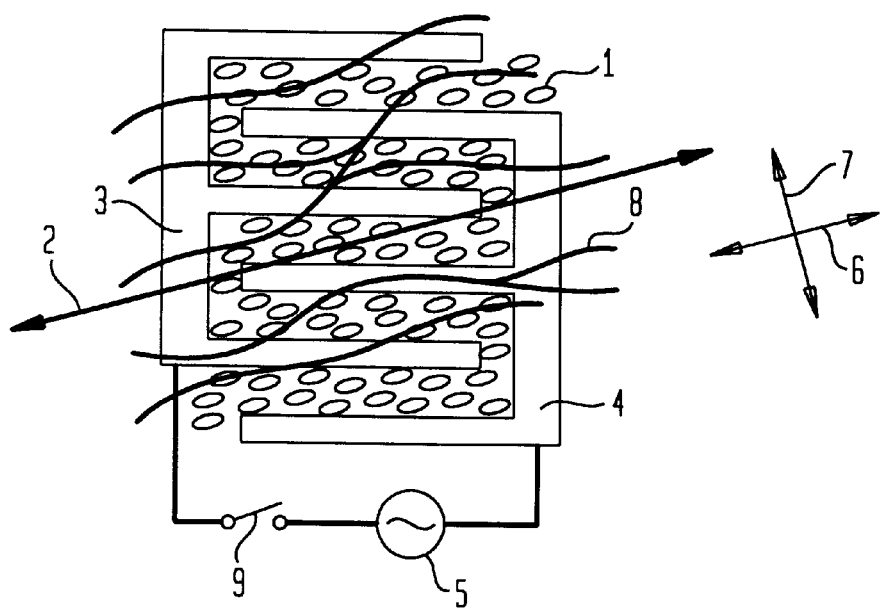
FIG. 3 shows a schematic view of a display element of an in-plane switched (IPS) liquid crystal display panel in accordance with the present invention, with polymer strands depicted within the liquid crystal material, in the absence of an applied electric field (i.e., in its field-off state).

FIG. 3 shows a similar schematic for an IPS liquid crystal display panel fabricated according to the present invention, depicting the additional presence of a network of polymer strands 8. As can be seen, polymer strands 8 are generally oriented along the double-ended arrow 2, which is along the average nematic orientation of the liquid crystal in the absence of an applied electric field.

An oriented network of polymer strands 8 may be formed by dissolving either a mesogenic polymer or a mesogenic polymer precursor (e.g. mesogenic monomer) with chain-growing and/or cross-linking groups, together with any necessary cross-linking agent, photoinitiator, and thermal curing agent, into the nematic liquid crystal material, prior to placing the mixture in an IPS LC display cell which is constructed in the usual manner, with alignment layers on its opposing glass or plastic substrates. Then, in the absence of an applied electric field, the polymerization is initiated in any suitable manner (e.g. by UV radiation or thermally) depending on the polymer or polymer precursor being used. During polymerization, the polymer network is believed to phase separate from the liquid crystal and form a phase separated network of strands comprising polymer molecules, where these resultant polymer strands on average follow the nematic orientation of the liquid crystal in the field-off state.

While this effect has been observed for nematics (Y. K. Fung, D.-K. Yang, S. Ling, L.-C. Chien, S. Zumer and J. W. Doane, Liq. Crys. 19, 797 (1995)), there is no suggestion of how it might be applied to reduce switching times following removal of applied signal voltage for in-plane switched (IPS) liquid crystal display devices.

Of course, the LC material itself may comprise any available LC material, such as E-48, available from Merck Industries, or IM-5556-XX, available from Chisso Electronics.

Figure 4:
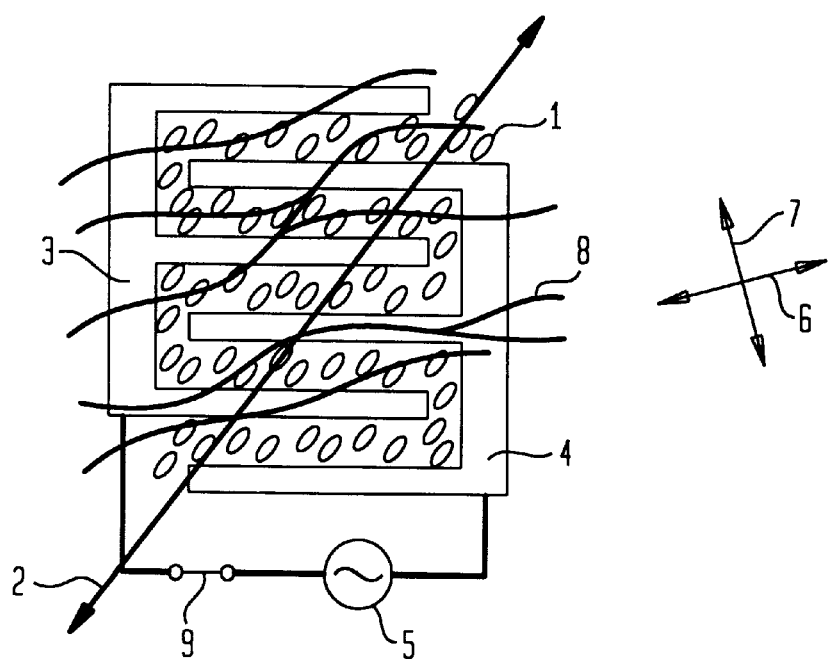
FIG. 4 shows a schematic view of a display element of an in-plane switched (IPS) liquid crystal display panel in accordance with the present invention, with polymer strands depicted within the liquid crystal material, in the presence of an applied electric field (i.e., in its field-on state).

Following polymerization and cross-linking, the polymer network is fixed in the cell and is believed to remain substantially unaltered by the application of a switching voltage to the IPS electrodes. While FIG. 4 shows that the liquid crystal 1 orients in response to the applied field, as in FIG. 2, the polymer network 8 remains in substantially the same orientation as in FIG. 3. When the applied voltage is removed from the electrodes, the network of polymer strands 8 is believed to provide a local reorienting force which shortens the time required for the liquid crystal molecules 1 to realign from the orientation of double-ended arrow 2 shown in FIG. 4 to that shown in FIG. 3.

A few specific examples will now be given.

EXAMPLE 1

The following is an actual example of fabricating and testing a specific IPS liquid crystal display panel according to the present invention.

A mixture was prepared consisting by weight of:
1) as liquid crystal material—95% nematic liquid crystal E-48 (Merck Industries),
2) as polymerizable material, a mesogenic polymer precursor (a mesogenic monomer in this case)—4.9% RM-206 (Merck Industries), together with a photoinitiator—0.1% benzoin methyl ether (BME).

A cell was prepared in a well-known manner from two glass plates. A metal layer of molybdenum/aluminum/molybdenum was deposited onto one of the glass plates. This layer was then photolithographically patterned to form interdigitated electrodes, at a position of a display element of the cell, with a spacing of 9 microns between electrodes. Following the deposition of the electrodes, both plates were coated with a polyimide and buffed to affect a nematic alignment of the liquid crystal along an axis parallel to the surface substrates and at 15 degrees off from the axis of the electrodes. The plates were sealed together and separated by 5 micron diameter spherical plastic beads.

The cell was vacuum filled with the polymerizable mixture as described above and irradiated with 0.5 mW/cm$^2$ UV radiation for 5.5 hours.

The cell was placed between polarizers crossed at 90 degrees with respect to each other, with one of the polarizers aligned with the average nematic orientation of the nematic liquid crystal (i.e., the optical axis) in the field-off state.

With no applied electric field, the cell between the crossed polarizers was dark. When a 1 kHz square wave electric field was applied across the electrodes, the polarizer/cell/polarizer combination became increasingly transparent with increasing applied voltage, reaching a maximum transmittance at an applied root mean square (RMS) voltage of 46V. Switching between applied voltages of 1 and 46 volts, the cell displayed a turn-on time (defined as the time to switch between 10 and 90% of maximum transmittance) of 16.3 ms and a turn-off time (defined as the time to switch between 90 and 10% of maximum transmittance) of 5 ms.

A similar, non-polymer stabilized in-plane switched display cell was prepared using the procedure stated above, with the exception that the cell was filled exclusively with E-48 nematic liquid crystal (that is, with no reactive monomer or photoinitiator material). When placed between polarizers crossed at 90 degrees with respect to each other, with one of the polarizers aligned with the average nematic orientation of the nematic liquid crystal (i.e., the optical axis) in the field-off state, this cell was also dark when no electric field was applied. When a 1 kHz square wave electric field was applied across the electrodes, the polarizer/cell/polarizer combination became increasingly transparent with increasing applied voltage, reaching a maximum transmittance at an applied RMS voltage of 10.6V. Switching between applied voltages of 1 and 10.6 volts, the cell displayed a turn-on time (defined as the time to switch between 10 and 90% of maximum transmittance) of 16.4 ms and a turn-off time (defined as the time to switch between 90 and 10% of maximum transmittance) of 55 ms, eleven times longer than that exhibited by the polymer stabilized in-plane switched LCD cell.

Figure 5:
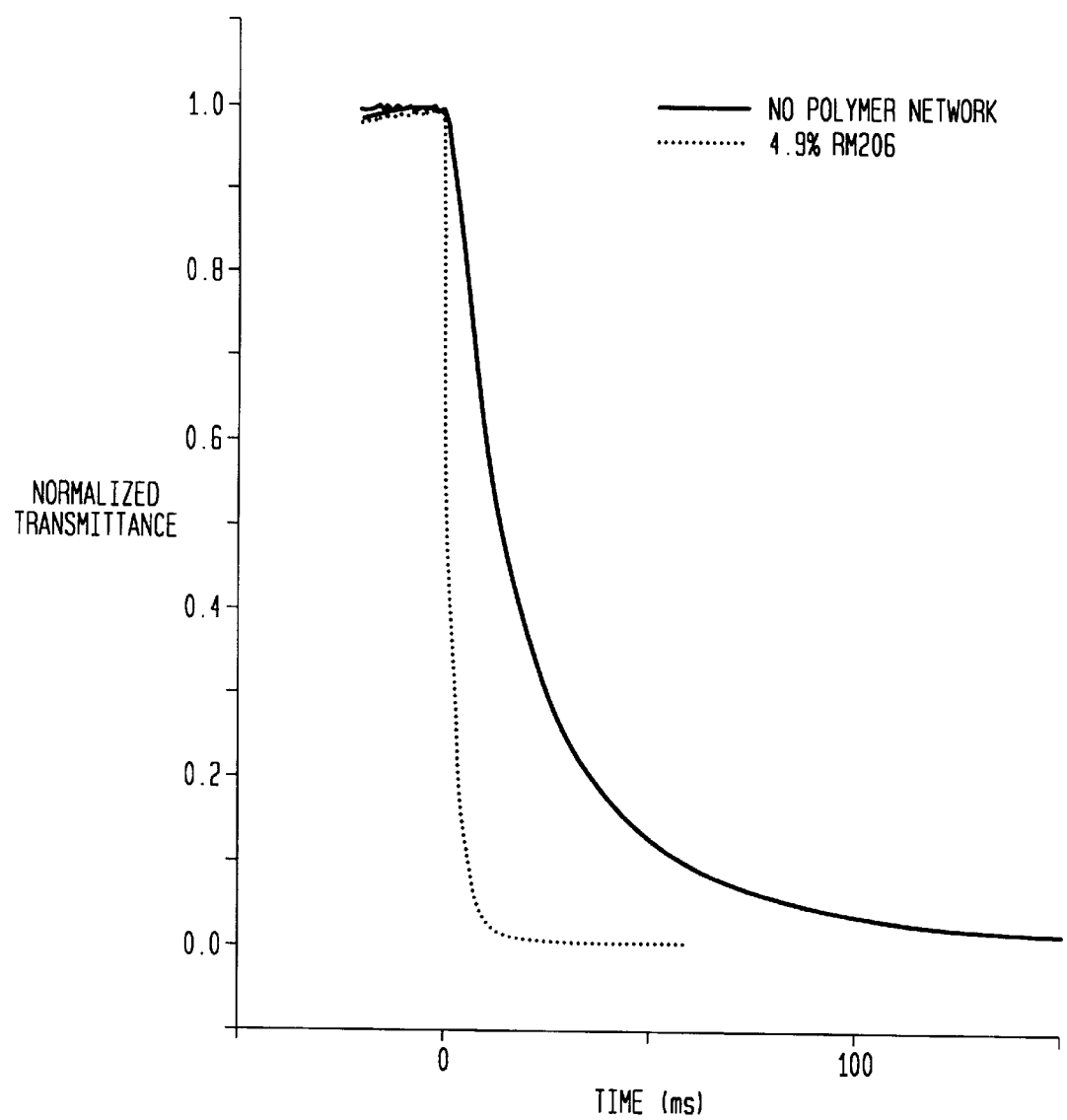
FIG. 5 is a graph of light transmittance versus time for both a conventional IPS liquid crystal display panel and an IPS liquid crystal display panel fabricated with polymer strands according to the present invention.

FIG. 5 shows a graph of transmittance versus time for both of these IPS LCD cells. As can be seen, the IPS LCD cell with the 4.9% RM 206 polymer network and 95% E-48 liquid crystal displayed a much faster switching response (per the dotted line) to removal of the applied voltage at time t=0 when compared with an IPS LCD cell containing only the E-48 liquid crystal (the solid line indicated for "no polymer network").

EXAMPLE 2

A second cell, exhibiting the advantages of the present invention, was constructed as in Example 1, but substituting the following materials (all percentages by weight):
Liquid crystal material: IM-5556-XX (Chisso Electronics)—96%
Mesogenic monomer: RM206 (Merck Industries)—3.9%
Photoinitiator: benzoin methyl ether (BME)—0.1%

EXAMPLE 3

A third cell, exhibiting the advantages of the present invention, was constructed as in Example 1, but substituting the following materials (all percentages by weight):
Liquid crystal material: IM-5556-XX (Chisso Electronics)—96%
Mesogenic monomer: 2,2',3,3',5,5',6,6'-octafluoro-4,4'-bis-{4-[6-(methacryloxy)-hexyloxy]benzoate}-1,1'-biphenylene-3.9-%
Photoinitiator: benzoin methyl ether (BME)—0.1%

EXAMPLE 4

A fourth cell, exhibiting the advantages of the present invention, was constructed as in Example 1, but substituting the following materials (all percentages by weight):
Liquid crystal material: IM-5556-XX (Chisso Electronics)—97.5%
Mesogenic monomer: BAMPB-6 (Kent State)—2.4%
Photoinitiator: benzoin methyl ether (BME)—0.1%

While the present invention has been described with reference to preferred embodiments in order to facilitate a better understanding of the invention, those skilled in the art will recognize that the invention can be embodied in various ways without departing from the scope and spirit of the invention as set forth in the appended claims.

What is claimed is:

1. An in-plane switched liquid crystal display panel comprising:
  a) a pair of substrates,
  b) a layer of nematic liquid crystal material disposed between said pair of substrates, said liquid crystal material having a nematic orientation in the absence of an applied electric field,
  c) a plurality of display elements, each display element of said plurality of display elements comprising a pair of mutually intermeshed electrodes disposed in a substantially single plane, and
  d) a network of phase-separated strands of mesogenic polymer distributed throughout said liquid crystal material, said polymer strands having an average orientation which substantially conforms with said nematic orientation in the absence of an applied electric field.

2. An in-plane switched liquid crystal display panel as set forth in claim 1, said network comprising mesogenic groups.

3. The in-plane switched liquid crystal display panel of claim 1, wherein said network of phase-separated strands of mesogenic polymer is distributed throughout said liquid crystal material, for providing optimized switching times of said display elements following removal of said applied electric field.

4. A method of fabricating an in-plane switched liquid crystal display panel comprising:
  a) preparing a mixture of a nematic liquid crystal material and a mesogenic polymerizable material, said nematic liquid crystal material having a nematic orientation in the absence of an applied electric field,
  b) introducing said mixture into an empty in-plane switched liquid crystal display panel comprising a pair of substrates, one of said substrates comprising a plurality of display elements formed thereon, each display element of said plurality of display elements comprising a pair of mutually intermeshed electrodes disposed in a substantially single plane, and
  c) initiating polymerization of said polymerizable material to form a phase-separated network of polymer strands, comprised of cross-linked polymer molecules, separated from said nematic liquid crystal material, said polymer strands having an average orientation which substantially conforms with said nematic orientation in the absence of an applied electric field.

5. A method as set forth in claim 4, said mesogenic polymerizable material comprising a member selected from mesogenic polymers and mesogenic polymer precursors together with a polymerizing agent therefor.

6. A method as set forth in claim 4, said mesogenic polymerizable material comprising a member selected from mesogenic polymers and mesogenic polymer precursors together with a cross-linking agent therefor.

7. A method as set forth in claim 4, said mesogenic polymerizable material comprising a member selected from mesogenic polymers and mesogenic polymer precursors together with a cross-linking agent and a polymerizing agent therefor.

8. A method as set forth in claim 4, said mesogenic polymerizable material comprising a member selected from UV-curable, thermoplastic, and thermosetting mesogenic polymers and their mesogenic monomeric precursors.

9. A method as set forth in claim 4, wherein said liquid crystal material is nematic liquid crystal E-48 (Merck Industries), said polymerizable material comprises mesogenic monomer RM-206 (Merck Industries) and a photoinitiator, said polymerization being initiated by exposure to ultraviolet radiation.

10. A method as set forth in claim 9, wherein said mixture comprises substantially 95% of said liquid crystal material, 4.9% of said mesogenic monomer, and 0.1% of said photoinitiator.

11. A method as set forth in claim 4, wherein said liquid crystal material is nematic liquid crystal IM-5556-XX (Chisso Electronics), said polymerizable material comprises mesogenic monomer RM-206 (Merck Industries) and a photoinitiator, said polymerization being initiated by exposure to ultraviolet radiation.

12. A method as set forth in claim 11, wherein said mixture comprises substantially 96% of said liquid crystal material, 3.9% of said mesogenic monomer, and 0.1% of said photoinitiator.

13. A method as set forth in claim 4, wherein said liquid crystal material is nematic liquid crystal IM-5556-XX (Chisso Electronics), said polymerizable material comprises mesogenic monomer 2,2',3,3',5,5',6,6'-octafluoro-4,4'-bis-{4-[6-(methacryloxy)-hexyloxy]benzoate}-1,1'- biphenylene and a photoinitiator, said polymerization being initiated by exposure to ultraviolet radiation.

14. A method as set forth in claim 13, wherein said mixture comprises substantially 96% of said liquid crystal material, 3.9% of said mesogenic monomer, and 0.1% of said photoinitiator.

15. A method as set forth in claim 4, wherein said liquid crystal material is nematic liquid crystal IM-5556-XX (Chisso Electronics), said polymerizable material comprises mesogenic monomer BAMPB-6 (Kent State) and a photoinitiator, said polymerization being initiated by exposure to ultraviolet radiation.

16. A method as set forth in claim 15, wherein said mixture comprises substantially 97.5% of said liquid crystal material, 2.4% of said mesogenic monomer, and 0.1% of said photoinitiator.

17. The method of claim 4, wherein said network of phase-separated strands of mesogenic polymer is distributed throughout said liquid crystal material, for providing optimized switching times of said display elements following removal of said applied electric field.

* * * * *

UNITED STATES PATENT AND TRADEMARK OFFICE
CERTIFICATE OF CORRECTION

PATENT NO. : 6,177,972 B1        Page 1 of 1
DATED : January 23, 2001
INVENTOR(S) : Glenn Allen Held, Sui-Chih Alan Lien, DoYeung Yoon and Ali Afzali-Ardakani It is certified that error appears in the above-identified patent and that said Letters Patent is hereby corrected as shown below:

<u>Title page,</u>
Add the inventor -- [75] Ali Afzali-Ardakani --.

Signed and Sealed this

Twenty-eighth Day of August, 2001

*Attest:*

NICHOLAS P. GODICI
*Attesting Officer*     *Acting Director of the United States Patent and Trademark Office*